Patented May 9, 1933

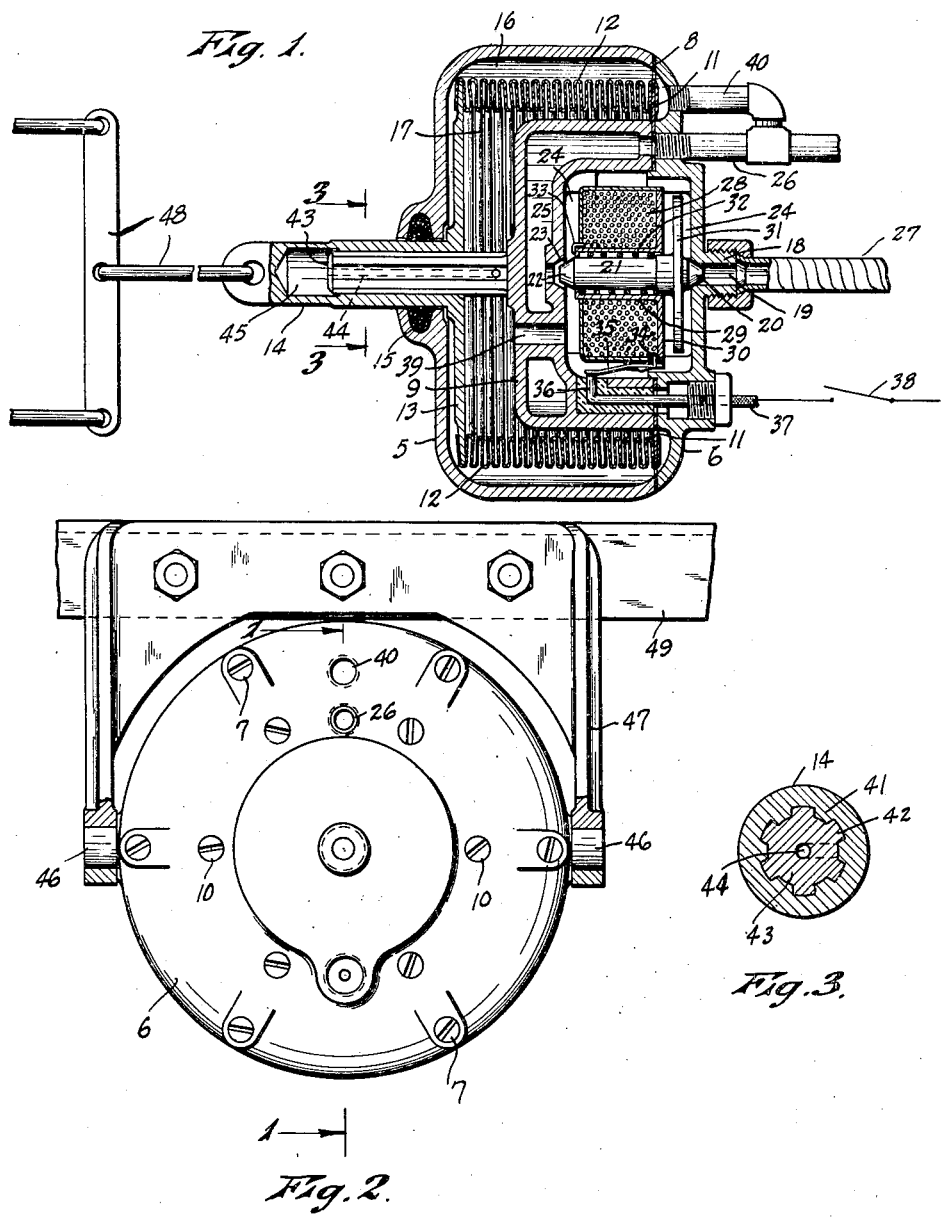

1,908,471

UNITED STATES PATENT OFFICE

CHARLES A. BREWER, OF NOROTON HEIGHTS, CONNECTICUT, ASSIGNOR OF ONE-HALF TO PHILIP J. KURY

PNEUMATICALLY OPERATED POWER DEVICE

Application filed September 10, 1928. Serial No. 304,853.

This invention relates to a pneumatically operated power device, particularly one which may be operated by a connection to some type of suction device, such as the intake manifold of an automobile engine, but it is not necessarily limited to such use.

It has for an object to provide a device of this type which may be electrically controlled from a distance.

It is also an object of the invention to provide a construction in which the frictional resistance is reduced to a minimum so that practically all the available power is employed in doing useful work.

It is another object of the invention to provide a device of this character which may be used for operating different devices, such for example as the brakes of an automobile, releasing the clutch of an automobile, and operating other devices.

It is a further object of the invention to provide a power device which is practically dust, dirt and moisture-proof so that it will function indefinitely without interference from these elements.

With the foregoing and other objects in view, the invention consists in certain novel features of construction, combinations and arrangements of parts as will be more fully described in connection with the accompanying drawing. In this drawing, Fig. 1 is a longitudinal section through the device with certain of the connecting elements shown in elevation, the section being substantially on line 1—1 of Fig. 2.

Fig. 2 is an end elevation looking from the right of Fig. 1, and

Fig. 3 is a transverse section substantially on line 3—3 of Fig. 1.

The device as illustrated comprises a housing in two sections, a body section 5 and a cap or closure section 6, the section 5 being open at one end which is closed by the cap 6, and which is secured to the body section by suitable screws 7 with a packing 8 between them to make a tight joint. Secured to the inner side of the cap 6 is an interior member 9 and it may be secured to the cap by suitable screws 10, and these screws clamp between the member 9 and the cap 6 a disc and packing 11 to which is attached one end of a flexible diaphragm 12, preferably in the form of a thin sheet metal bellows, and the other end of this bellows is closed by a plate 13 carrying a hollow stem 14 passing through the end wall of the housing section 5 opposite to the cap 6 and in which it is slidable. The housing section has an annular groove in which is placed a suitable packing 15 embracing the stem to prevent entrance of dust, dirt or moisture, and also may retain oil for lubricating the stem 14 which is, therefore, mounted to slide longitudinally of the housing as the diaphragm 12 expands and contracts. This diaphragm and disc 13, therefore, divide the housing into two chambers or spaces, an exterior chamber or space 16 and an interior chamber or space 17 which are normally out of communication with each other.

The member 9 projects from the cap 6 into the chamber 17, and therefore, in effect reduces the capacity of this chamber by reducing the amount of gas this chamber will hold. The cap 6 has a nipple 18 with an opening 19 therein having a valve seat at its inner end which may be closed by a valve 20 carried by a longitudinally reciprocable bar 21, and this bar carries at its opposite end a valve 22 adapted to seat on a valve seat in a passage 23 leading from a chamber 24 formed by the cap 6 and the member 9 to an interior chamber 25 in the member 9. This chamber 25 is in communication with the atmosphere either by an opening through the casing or by a pipe 26 leading to any suitable location, such for instance, as the interior of a closed automobile where it is less likely to pick up dust and dirt, if the device is used for operating an automobile brake or clutch. The opening 19 is connected by means of a flexible pipe 27 with any suitable source of suction, such for example as the intake manifold of an automobile engine.

The valves 20 and 22 are operated simultaneously by an electrical solenoid 28 embracing the bar 21. This encloses a central tubular shell 29 having a flange 30 at one end and they are preferably of magnetic material so as to cooperate with the flange 31 on the bar 21 to give a greater pulling effect on the bar when the solenoid is energized. A coil spring 32 embraces the bar 21 and tends to move the same to the right, as viewed in Fig. 1. One end of the coil is grounded, as shown at 33, while the other end, as shown at 34, extends through suitable insulation and is connected with a contact 35 engaging an insulated conductor 36 leading out of the housing and connected by any suitable lead 37 with a controlling switch 38. The chambers 24 and 17 are in communication with each other through openings 39, and the chamber 16 may be placed in communication with the atmosphere by an opening in the housing or by a pipe 40 connecting to the pipe 26. The interior of the stem 14 is provided with longitudinal ribs 41 alternating with similar ribs 42 running in the grooves between the ribs 41, the ribs 42 being mounted on a stem 43 connected to the member 9. This arrangement permits the stem 14 to slide longitudinally but prevents its turning, and therefore, prevents its twisting or breaking the diaphragm 12 when operated. These bearings for the stem 14 also prevent cramping of the diaphragm 12. The stem 43 is provided with a passage 44 extending from the passage 45 in the stem 14 to the chamber 17 so as to equalize the pressures between them.

The housing may be mounted on any suitable support preferably trunnions 46 which may be mounted in any suitable bearings, such as in the arms of a bracket 47 to thus allow the housing to turn somewhat, if desired, during its operation to prevent binding. The stem 14 is connected to any suitable operating means, and if it is used for operating the brake of a car may be connected to the brake mechanism by any suitable link connection 48. The bracket 47 may be mounted on any suitable support, such as the cross bar 49 of an automobile frame.

The operation is as follows: The elements are shown in Fig. 1 in their normal position. If it is desired to operate some mechanism, as for instance the brakes of an automobile or release a clutch to which the stem 14 is connected, the operator closes the switch 38. This energizes the solenoid 28 shifting the bar 21 to the left as viewed in Fig. 1 together with the valves 20 and 22. This opens the valve 20 and closes the valve 22, thus placing the chambers 24 and 17 in communication with the suction pipe 27. This immediately reduces the pressure in the chamber 17, and as there is atmospheric pressure in the chamber 16 this pressure will force the plate 13 to the right, as viewed in Fig. 1, carrying with it the stem 14 and applying force to whatever it is connected. The operating force, of course, is the difference in the pressures between the chambers 16 and 17 multiplied by the effective area of the plate 13. If the switch 38 is open the solenoid 28 is deenergized and the rod 21 with the valves 20 and 22 will be shifted to the right by the spring 32, thus closing entrance to the pipe 27 by the valve 20 and opening the valve 22 so that now the chamber 17 is in communication with the chamber 25 through the passages 39, chamber 24 and the valve passage 23. Chamber 17 is thus in communication with the atmosphere permitting the pressures in the chambers 16 and 17 to equalize, diaphragm 12 will expand or be shifted back by any spring mechanism connected with the brake or clutch or other device, or the diaphragm 12 itself will swing back to the expanded position.

It will be apparent from the description and the drawing that the whole unit and the housing arrangement is practically water, dust and dirt tight. The keyed stem 43 protects the bellows or diaphragm from torsion or bending in the pulling effort. Bending is taken care of by the long support between the members 43 and 14. It will also be apparent that the whole unit including the bellows or diaphragm is removable from the outer casing or mounting housing section 5 by removing the cap screws 7. Also as suggested above the inner member 9 forms a displacing element to fill up or displace some of the space within the bellows, the amount being dependent upon the use to which the device is put. Thus there is less air in the space or chamber 17 to be drawn out when the valve 20 is opened and it thus gives quicker action. In other words the member 9 cuts down the dead space and by varying its size the quickness of action may be regulated. The size of the openings through the valves 20 and 22 and the openings to the atmosphere from chambers 16 and 17 will also determine the quickness of action, and therefore, the sizes of these openings will be determined according to the work to be performed.

The control switch 38 may be operated by hand or it may be operated automatically. For example, this switch may be closed by the action of a bumper on the car should it hit some object to thus apply the brakes of a car, or if the device is used for releasing the clutch of an automobile a second switch in the circuit may be operated by the door of the car so that the clutch cannot be engaged until the door is shut, thus preventing operation of the car while the door is open. Other applications and uses of the device will readily suggest themselves to one skilled in the art.

Having thus set forth the nature of my invention, what I claim is:

1. In a power device of the character described, a self-contained unit adapted to be mounted as such comprising a housing, a movable operating element in the housing dividing it into separate chambers, means for connecting the chamber in one side of said element to a source of suction, a valve for controlling said connection, means including another valve for connecting said chamber with the atmosphere, an electrically operated means for controlling said valves, said valves and electrical means being enclosed by the housing, and an operative connection from said element and operated thereby.

2. In a power device of the character described, a housing, a flexible diaphragm in said housing, operative means connected to the diaphragm and extending from the housing, means connecting the space on one side of the diaphragm with the atmosphere and with a source of suction including opposed valve seats, a movable member between said seats, valves carried by said member and adapted to cooperate with said seats to control said connections, a solenoid between said seats surrounding said member for shifting the same, electrical connections to said solenoid, and a control switch for said solenoid.

3. In a power device of the character described, a flexible diaphragm, an operative element connected to the diaphragm, means connecting the space on one side of said diaphragm with the atmosphere and with a source of suction including a pair of opposed valve seats, a movable member between said seats, valves carried by said member to cooperate with the respective seats to control said connections, and electrically controlled means between said seats for shifting said member to control the movements of the diaphragm.

4. In a power device of the character described, a housing including a body section and a cap enclosing one side of the body section, a flexible bellows diaphragm in the housing secured at one end to the cap, operative means connected to the other end of the diaphragm and extending from the housing, means carried by the cap for connecting the interior of the diaphragm with the atmosphere and with a source of suction including opposed valve seats within the housing, a movable member between said seats, valves carried by said member to cooperate with the respective seats to control said connections, a solenoid carried by the cap within the housing in position to shift said member and the valves carried thereby, electrical connections to said solenoid, and a control switch in said connections.

5. In a power device of the character described, a housing, a flexible bellows diaphragm in said housing, a cap closing one end of the housing, means for securing one end of the diaphragm to the cap, the other end of the diaphragm being movable, an operative means connected to said movable end and including a tubular element extending from the casing, a hollow element connected to the cap and projecting into the space in said diaphragm, a stud on said hollow element extending into said tubular element, said stud and element having a coacting longitudinal rib and groove to prevent relative turning movements between them, opposed valve seats carried by the cap and the hollow element and having communication with the space within the diaphragm, a connection from one of said valve seats to the atmosphere, a connection from the other valve seat to a source of suction, a movable element between said valve seats, valves carried by the movable element to cooperate with said seats to control said connections, a solenoid surrounding the movable element, electrical connections to the solenoid, and a control switch in said connections.

6. In a power device of the character described, a housing, a diaphragm in said housing, a cap closing one end of the housing, means for securing one end of the diaphragm to the cap, the other end of the diaphragm being movable, an operative means connected to said movable end and extending from the casing, a hollow element having connection to the atmosphere and connected to the cap and projecting into the space in said diaphragm, a valve seat in said cap leading to a source of suction, a valve seat in said hollow element in alignment with said cap valve seat, a double ended valve adapted to seat in said valve seats alternately, and means for actuating said valve.

7. In a power device of the character described, a housing, a diaphragm in said housing, a cap closing one end of the housing, means for securing one end of the diaphragm to the cap, the other end of the diaphragm being movable, an operative means connected to said movable end and extending from the casing, a hollow element having connection to the atmosphere and connected to the cap and projecting into the space in said diaphragm, a valve seat in said cap leading to a source of suction, a valve seat in said hollow element in alignment with said cap valve seat, a double ended valve adapted to seat in said valve seats alternately, and means for actuating said valve comprising a solenoid between the valves to actuate it to one of the seats and a spring to actuate it to the other of said seats.

8. In a power device of the character described, a housing, a movable element in said housing dividing it into separate compartments, an operative connection from said element, a connection from the compartment on one side of said element to a source of suction, opposed valve seats carried by said housing, a connection from one of said seats to the atmosphere, a connection from the other valve seat to said connection to a source of suction, a movable element between said valve seats, valves carried by the movable element to cooperate with said seats to control said connections, a solenoid surrounding the movable element between said seats, electrical connections to the solenoid, and a control switch in said electrical connections.

9. In a power device of the character described, a casing, a flexible bellows diaphragm in said casing and secured thereto at one end, an operative connection secured to the movable end of the bellows and extending from the casing, a hollow element projecting into the bellows having a passage communicating with the atmosphere and a chamber in communication with the space within the bellows, opposed spaced valve seats one of which communicates with said passage, a connection from the other valve seat to a source of suction, a solenoid in said chamber, a sliding bar enclosed by the solenoid, and valves at the opposite ends of said bar to alternately seat on said valve seats move therefrom to alternately open or close communication of the space in said bellows with the atmosphere and the source of suction.

In testimony whereof I affix my signature.

CHARLES A. BREWER.